(12) United States Patent
Giannatos

(10) Patent No.: US 6,377,796 B1
(45) Date of Patent: Apr. 23, 2002

(54) MOBILE PHONE SWITCHBOARD

(76) Inventor: Georgios Giannatos, 29-31 Neofronos Street, GR-16121, Athens (GR)

(*) Notice: Subject to any disclaimer, the term of this patent is extended or adjusted under 35 U.S.C. 154(b) by 0 days.

(21) Appl. No.: 09/171,466
(22) PCT Filed: Feb. 19, 1998
(86) PCT No.: PCT/GR98/00006
§ 371 Date: Dec. 19, 1998
§ 102(e) Date: Dec. 19, 1998
(87) PCT Pub. No.: WO98/37684
PCT Pub. Date: Aug. 27, 1998

(30) Foreign Application Priority Data

Feb. 20, 1997 (GR) .................................... 971000069

(51) Int. Cl.⁷ .............................................. H04M 3/42
(52) U.S. Cl. ..................... 455/417; 455/575; 455/560
(58) Field of Search .................................. 455/417, 575, 455/560, 556, 557

(56) References Cited

U.S. PATENT DOCUMENTS 5,757,902 A * 5/1998 Mitsuo .................. 379/212.01
6,212,395 B1 * 4/2001 Lu ............................. 455/463

* cited by examiner

Primary Examiner—Vivian Chang
Assistant Examiner—James K Moore
(74) Attorney, Agent, or Firm—Patton Boggs LLP

(57) ABSTRACT

The mobile phone switchboard is a central unit, which operates as a mobile phone which is attached to other internal units 1, 2, 3, . . . 9 or more. It is similar to the usual mobile phone handsets and it is equipped with 4 illuminating lights (Inq., Tran., I, II). With the mobile phone switchboard it becomes possible to third party to operate mobile phones. (such as disabled people or even more children and so on), with controlled operation costs. At anytime parents are able to communicate with their children and vice versa, with controlled cost via the central unit. Additionally the mobile phone switchboard has the following specifications:
1. Modification of the central unit to operate in Direct Inward Dialing (D.I.D.) for higher benefit of the mobile phone network.
2. Call transfer to other telephone units/numbers.
3. Simultaneous conversation with several calls.

17 Claims, 2 Drawing Sheets

MOBILE PHONE SWITCHBOARD

BACKGROUND OF THE INVENTION

1. Field of the Invention

This invention relates to a mobile phone unit and, more particularly, a mobile phone unit having a keyboard for dialing, registering, selection of the operation menus of the unit, and a screen, aerial, and rechargeable battery.

2. Related Art

Many kinds and configurations of mobile phones are known in the art. A typical mobile phone, however, is loaded with a secret PIN code, for example "5555", and a calling code, for example "094-802350. Use of this typical mobile phone is restricted to only one person at a time. This results in a high fixed operational cost. On the other hand, control on the cost is maintained by the person who operates the phone.

The factors identified above result in a number of shortcomings, one being that the device cannot be used by a third party such as, for example, a disabled person and child, with external control of the operational costs.

SUMMARY OF THE INVENTION

In view of the above-identified needs and shortcomings in the prior art, a first embodiment of the present invention is a method for selectably controlling connections between a plurality of mobile telephones and a telephone network. The method of the first embodiment begins with providing a phone controller comprising a first mobile phone, and a plurality of secondary mobile phones, each one of the secondary phones being switchable between a first outgoing state, in which it can place calls to the network and a second outgoing state, in which the secondary phone is blocked from placing calls to the network. Each of the secondary phones is switchable between a first incoming state, in which the phone can receive calls from the network and a second incoming state, in which the phone is blocked from receiving calls from the network.

The method of the first embodiment then selectively performs the following steps, by receiving user commands at the provided phone controller:

(a) independently controlling the incoming and outgoing states of the secondary mobile phones;

(b) receiving incoming calls for the secondary phones in the second incoming state and selectively routing the received calls to one of the secondary mobile phones; and, (c) receiving outgoing calls from the secondary mobile phones in the second outgoing state and selectively connecting the received calls to the network.

Further embodiments of the first method carry out the step of using the phone controller to independently control the incoming and outgoing states of the secondary mobile phones by detecting an actuating of a first button means on the phone controller, and carry out the step of using the phone controller to independently control the incoming and outgoing states of the secondary mobile phones by displaying a menu on the phone controller and detecting entry of a selection command corresponding to the menu.

Still further embodiments carry out the step of using the phone controller to receive incoming calls for the secondary mobile phones in the second incoming state and selectively routing the received calls to one of the secondary mobile phones by detecting an actuating of a second button means on the phone controller.

A further embodiment of the present invention is a mobile phone control system for selectably controlling connections between a plurality of mobile telephones and a telephone network. The system according to this embodiment includes a central unit comprising a first mobile phone, and a plurality of secondary mobile phones. Each of the secondary phones is switchable between a first outgoing state and a second outgoing state. In the first outgoing state the secondary phone can place calls to the network. In the second outgoing state the secondary phone is blocked from placing calls to the network. Each of the secondary phones is also switchable between a first incoming state and a second incoming state. In the first incoming state, the secondary phone can receive calls from the network. In the second incoming state, the secondary mobile phone is blocked from receiving calls from the network. The central unit mobile phone thereby controls the incoming and outgoing states of each of the secondary mobile phones, receives incoming calls for the secondary phones that are in the first incoming state and selectively routes the received calls to one of the secondary mobile phones. In addition, the central unit mobile phone receives outgoing calls from the secondary mobile phones in the second outgoing state and selectively connects the received calls to the network.

Referring to FIG. 1, the central unit may be in accordance with current conventional mobile phone devices, with an additional plurality of, for example four illuminated buttons, labeled, for example as Inq., Tran., I, II.

The Inq. button of this example initiates an Inquiry operation. The Inquiry function blocks every incoming call, and enables the user to:

a. Change the communication of the calls.

b. Pick a new number of a connected phone unit or another mobile or conventional (wired) telephone number.

The Tran. button of this example initiates a Transfer operation, which transfers incoming calls to an internal or external phone unit that the user has selected.

The button I of this example illuminates in response to receiving the first incoming or outgoing call.

The button II of this example illuminates in response to receiving the second incoming or outgoing call concurrent with the first call.

The mobile phone switchboards having the above-described button-operated functions provide each of the following features and benefits:

1. Handling a conversation with more than one internal or external telephone lines.

2. Receiving and transferring, if desired, calls from internal phone units such as, for example, Internal Unit Nos. 1, 2, 3, . . . 9, or other mobile or conventional telephone numbers.

3. Selecting the internal phone units that can directly accept incoming calls, where "directly" means not through the central switchboard phone.

4. Selecting which of the internal units, if any, that remain available to communicate with other internal or external phone units, without having to communicate through the central switchboard phone.

5. Cutting off all communications to and from all connected units by operating the Off button on the central unit.

6. Displaying on the central unit the following:

a. The identifying number of the internal unit that is engaged.

b. The total cost of the call.

The mobile switchboard in accordance with the present invention extends the use of mobile phones to third parties, meaning parties other than the party legally responsible for the bill, such as disabled people and children, by providing a control for the phone operation cost. Parents can thus communicate at anytime with their children, and vice versa, with controlled cost through the central unit.

The present invention thereby provides an opportunity for the mobile phone businesses, including manufacturers, to increase their business by introducing new products in their range, such as portable switching handsets or switchboards of mobile phones. In addition, the existing base of mobile phones can be used as internal units or stand alone units.

Further, the present invention increases the efficiency in the use of the existing telephone network, and lowers the operating cost, by introducing a multiple connection point of mobile phone units. In other words, this invention provides multiple use of mobile phones via one or more numbers. The present invention thereby enables an increased number of users and an increased market for mobile phones.

The present invention provides reduced operation costs for consumers, i.e., the fixed cost for the central unit plus a small fee for any extra unit attached to it.

Numerous other features, objects and advantages of the invention will become apparent from the following description when read in conjunction with the accompanying drawings.

DETAILED DESCRIPTION OF THE INVENTION

Figure 1:
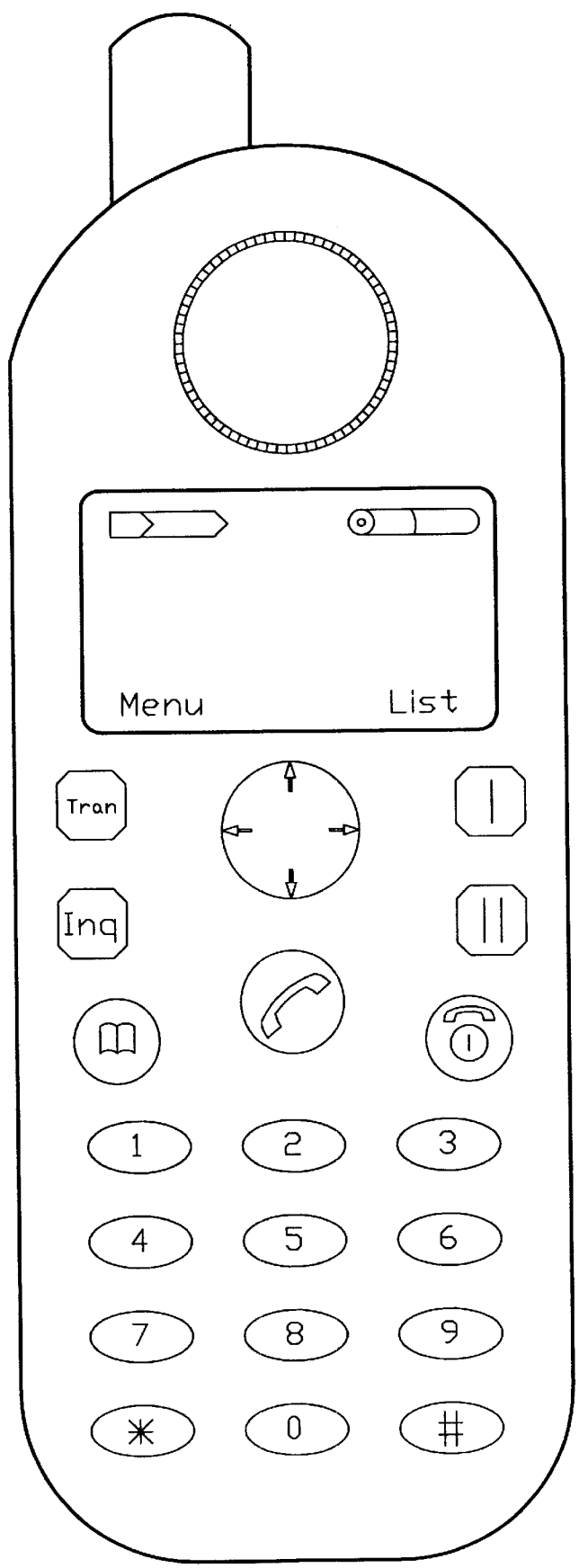
FIG. 1 shows an example keypad of a central unit in accordance with the present invention.
Figure 2:
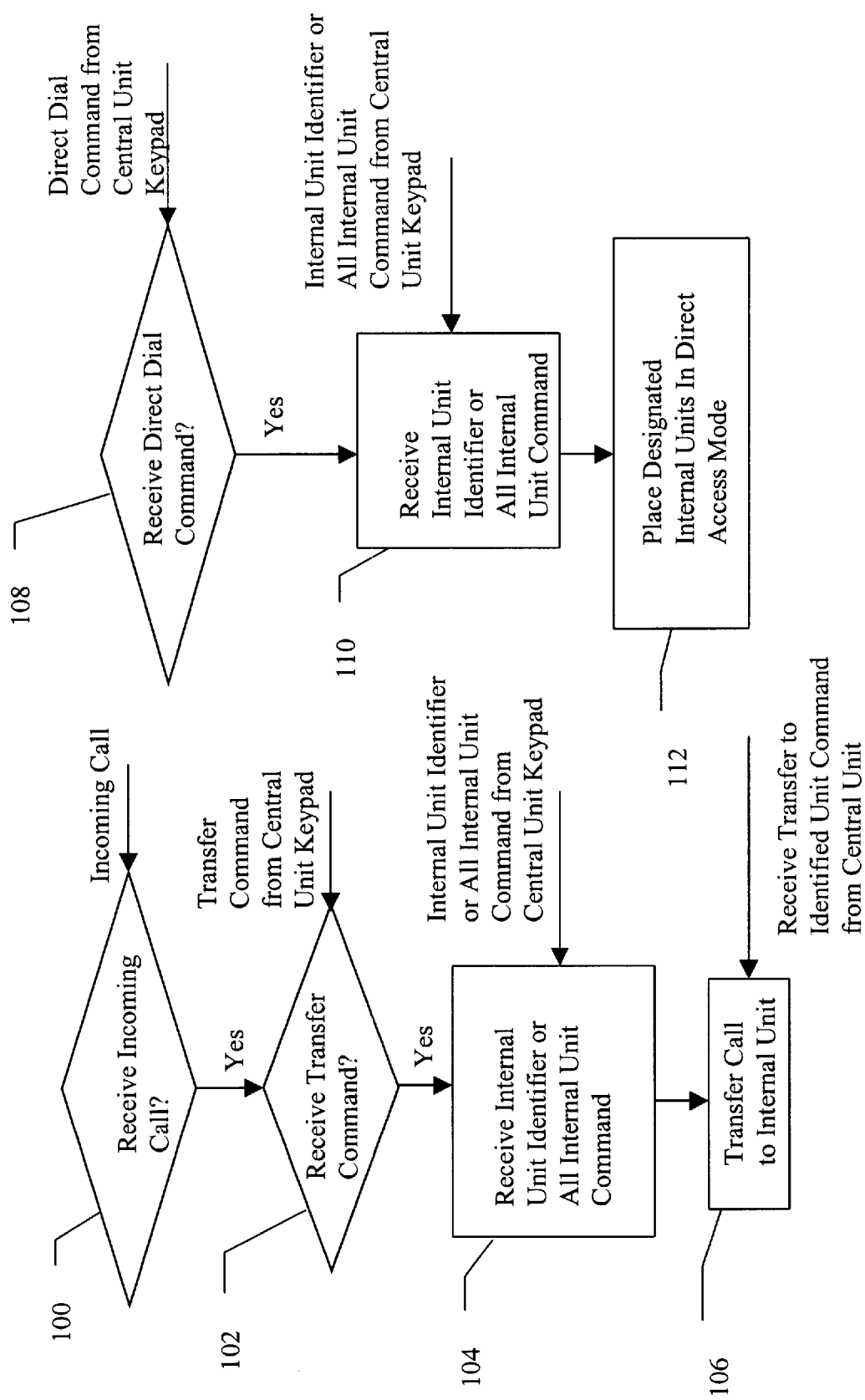
FIG. 2 shows an example block flow chart of a central unit controlling incoming calls according to the method of the present invention.

Referring to FIGS. 1–2, an example method according to the present invention will be described. For this example, there will be a Central Unit and nine Internal Units, each having a corresponding PIN and Dialing Number as illustrated below.

| MOBILE PHONE SWITCHBOARD | PIN | DIALING NUMBER |
|---|---|---|
| Central Unit | 5550 | 094-802380 |
| Internal Unit No. 1 | 5551 | 094-802381 |
| Internal Unit No. 2 | 5552 | 094-802382 |
| ... | ... | ... |
| Internal Unit No. 9 | 5559 | 094-802389 |

The Central Unit is a mobile phone. The Internal Unit Nos. 1–9 may be mobile phones or conventional wired telephones.

INCOMING CALL

Referring to FIG. 2, the example embodiment routs incoming calls as follows:

As shown in step 100, regardless of which of the above-listed DIALING NUMBERS that is called, i.e., if any of 094-802380 . . . 094-802389 are called, the incoming call passes through the Central Unit i.e. switchboard (dialing number 094-802380).

Referring to step 102, if the Central Unit operator wishes to transfer the incoming call to any of the Internal Units, i.e., Internal Units 1–9, he or she presses the button Inq., and then goes to step 104 and selects the number of the unit or the phone number to which he or she wishes to transfer the call (for example internal Unit No. 3, 094-802383) and then at step 106 transfers the call by pressing the button Tran.

Referring to step 108, through the Menu button, by pressing, for example the No. 2 button, followed by pressing, at step 110, any button between, for example, Nos. 0 and 9, the Central Unit can put, as shown at step 112, any Internal Unit into a Direct Inward Dialing (D.I.D.) mode, i.e. the Central Unit can allow free access to the telephone network to as many Internal Units as it wishes, e.g., from No. 1 to . . . No. 9, thereby allowing those units to receive direct calls directly without going through the Central Unit.

Example:
1. The user of the central Unit presses the button Menu, followed by the button sequence "21" to provide direct access to Internal Unit No. 1.
2. The user of the central Unit presses the button Menu, followed by the button sequence "22" to provide direct access to Internal Unit No. 2.
3) The user of the Central Unit presses the button Menu, followed by the button sequence "29" to provide direct access to Internal Unit No. 9.
4) The user of the Central Unit presses the button Menu, followed by the button sequence "20" to provide direct access to all Internal Units.

In this way the users of the Internal Units can directly select the unit on which he or she wishes to be connected. (For example Unit No. 3 calls 094-802383.)

OUTGOING CALL

The example embodiment routes of outgoing calls are as follows:

All the Internal Units initially communicate through the Central Unit (dialing number 094-802380). The Central Unit can transfer the call to another internal Unit or telephone number by pressing the buttons Inq., for inquiry, & Tran. for transfer, as in the example 1.a Through the Menu button, as in example No. 3 for incoming calls described above, the Central Unit can allow as many Internal Units as the user wishes, starting from No. 1 through, for example, No. 9, to make direct calls that are not controlled by the Central Unit.

Example:
1) The user of the Central Unit presses the button Menu and the button sequence "31" to let the Internal Unit No. 1 make outgoing calls.
2) The user of the Central Unit presses the button Menu and the button sequence "32" to let the Internal Unit No. 2 make outgoing calls.
3) The user of the Central Unit presses the button Menu and the button sequence "39" to let the Internal Unit No. 9 make outgoing calls.
4) The user of the Central Unit presses the button Menu and the button sequence "30" to let all the Internal Units which, in the example embodiment would be Internal Unit Nos. 1 though 9, attached to the Central Unit make outgoing calls.

As seen from the description above, the user of the Central Unit can press Menu No. 2 and Menu No. 3 to block or let through incoming or outgoing calls, or both, to pre-selected internally attached units. For example, by pressing Menu and then pressing the button sequence "23", and then pressing Menu followed by the button sequence "33", Internal Unit No. 3 becomes autonomous to incoming or outgoing calls.

CONVERSATION WITH MORE THAN ONE CALL

With the first incoming call, button I on the central Unit illuminates. If there is a second call then button II also illuminates. If the user of the Central Unit does not want to speak with incoming call No. 1, but wishes to speak with incoming call No. 2, he or she presses button Inq. to block incoming call No. 1 and then presses the button II to speak with the $2^{nd}$ call.

If the user wishes to return to call No. 1, he or she presses the button Inq., blocks the $2^{nd}$ call and, by pressing the button I, speaks to the $1^{st}$ call.

If he or she wishes to keep the $1^{st}$ line and speak with a new line, he or she presses the button Inq., which blocks the $1^{st}$ line, and then selects the new number of the line with which he or she wishes to speak.

PREVIOUS SITUATION

The mobile phone switchboard is an extension in the use of mobile phone handsets which consists of keyboards for dialing and registering, selection of the operation menus of the unit, display, aerial and rechargeable battery. Equipment of such type is already known. These devices are loaded with a secret PIN code, for example 5555, and a calling code for example 094-802350. Use of this device is restricted to only one person at a time, therefore resulting to a high fixed operation cost and on the other hand control on the cost of use can only be performed by the person which operates it. The above results to the fact that this device cannot be used by third party, such as disabled people or children and so on, with controlled operation costs.

What is claimed is:

1. A method for selectably controlling connections between a plurality of mobile telephones and a telephone network comprising the steps of:
   providing a phone controller comprising a first mobile phone;
   providing a plurality of secondary mobile phones, each one of said secondary phones being switchable between a first outgoing state wherein said secondary phone can place calls to said network and a second outgoing state wherein said secondary phone is blocked from placing calls to said network and being switchable between a first incoming state wherein said secondary phone can receive calls from said network and a second incoming state wherein said secondary phone is blocked from receiving calls from said network; and,
   using said controller:
      to independently control said incoming and outgoing states of said secondary mobile phones;
      to receive incoming calls for said secondary phones in second incoming state and selectively route said received calls to one of said secondary phones; and,
      to receive outgoing calls from said secondary phones in said second outgoing state and selectively connect said received calls to said network.

2. The method of claim 1 wherein the step of using said controller to independently control the incoming and outgoing states of said secondary mobile phones comprises the step of actuating a first button means on said phone controller.

3. The method of claim 1 wherein the step of using said controller to independently control the incoming and outgoing states of said secondary mobile phones comprises the step of selecting an option from a menu on said phone controller.

4. The method of claim 1 wherein the step of using said controller to receive incoming calls for said secondary phones in said second incoming state and selectively route said received calls to one of said secondary phones comprises the step of actuating a second button means on said phone controller.

5. The method of claim 4 wherein said phone includes a first indicator for indicating that a first call has been received at said controller and a second indicator for indicating that a second call has been received at said controller.

6. The method of claim 1 wherein the step of using said controller to receive incoming calls for said secondary phones in said second incoming state and selectively route said received calls to one of said secondary phones comprises the step of selecting an option from a menu on said phone controller.

7. A mobile phone control system for selectably controlling connections between a plurality of mobile telephones and a telephone network comprising:
   a phone controller comprising a first mobile phone;
   a plurality of secondary mobile phones, each one of said secondary phones being switchable between a first outgoing state wherein said secondary phone can place calls to said network and a second outgoing state wherein said secondary phone is blocked from placing calls to said network and being switchable between a first incoming state wherein said secondary phone can receive calls from said network and a second incoming state wherein said secondary phone is blocked from receiving calls from said network; and,
   wherein said controller functions to:
      independently control said incoming and outgoing states of said secondary mobile phones;
      receive incoming calls for said secondary phones in said second incoming state and selectively route said received calls to one of said secondary phones; and,
      receive outgoing calls from said secondary phones in said second outgoing state and selectively connect said received calls to said network.

8. The system of claim 7 wherein said controller comprises a first button means for controlling the incoming and outgoing states of said secondary mobile phones.

9. The system of claim 7 wherein said controller comprises menu means for allowing a user to control the incoming and outgoing states of said secondary mobile phones.

10. The system of claim 7 wherein said controller comprises a second button means for selectively routing said received calls to one of said secondary phones.

11. The system of claim 10 wherein said phone controller includes a first indicator for indicating that a first call has been received at said controller and a second indicator for indicating that a second call has been received at said controller.

12. The system of claim 7 wherein said controller comprises menu means for allowing a user to selectively route said received calls to one of said secondary phones.

13. The system of claim 7 wherein said phone controller includes display means for displaying information on the length or cost of a call to or from one of said secondary phones.

14. The system of claim 7 wherein said phone controller includes display means for displaying information on the incoming state status and outgoing state status of said secondary phones.

15. The system of claim 7 wherein said phone controller includes display means for displaying information identifying the secondary phone to which a particular received call is directed.

16. A method for selectably controlling the cost of connecting a plurality of mobile telephones to a telephone network comprising the steps of:

providing a phone controller comprising a first mobile phone;

providing a plurality of secondary mobile phones, each one of said secondary phones being switchable between a first outgoing state wherein said secondary phone can place calls to said network and incur network charges and a second outgoing state wherein said secondary phone is blocked from placing calls to said network and blocked from incurring network charges and being switchable between a first incoming state wherein said secondary phone can receive calls from said network and a second incoming state wherein said secondary phone is blocked from receiving calls from said network; and, using said controller:

to control network charges incurred by said plurality of secondary mobile phones by independently controlling said incoming and outgoing states of said secondary mobile phones;

to receive incoming calls for said secondary phones in second incoming state and selectively route said received calls to one of said secondary phones; and, to receive outgoing calls from said secondary phones in said second outgoing state and selectively connect said received calls to said network.

17. The system of claim 16 wherein said plurality of secondary phones are blocked from incurring network charges when in said second incoming state.

* * * * *